March 1, 1960 O. E. WERNER ET AL 2,926,594

INFUSION DEVICES

Filed May 15, 1957

INVENTORS:
OTTO E. WERNER
RICHARD J. MUELLER
BY Marshall, Johnston, Cook & Root
ATT'YS

United States Patent Office 2,926,594
Patented Mar. 1, 1960

2,926,594

INFUSION DEVICES

Otto E. Werner, Skokie, and Richard J. Mueller, Franklin Park, Ill., assignors to Automatic Canteen Company of America, Inc., Chicago, Ill., a corporation of Delaware Application May 15, 1957, Serial No. 659,255

2 Claims. (Cl. 99—295)

This invention, in general, relates to infusion devices and, more particularly, to infusion devices wherein a liquid is passed through a body of particulate solids to extract a desired substance or substances from said solids.

The brewing of coffee is an example of an infusion process in which hot water is passed through a body of ground coffee to extract flavoring ingredients. Many types of devices for brewing coffee are well known. The infusion devices of the present invention are designed to brew coffee by a single passage of hot water through a body of ground coffee. Because of their simple construction, they may be manufactured at low cost and are easy to maintain and service.

An important factor in the design of infusion devices adapted for the brewing of coffee is the ability of the device to obtain a substantially uniform extraction of all of the ground coffee during the brewing period. The water admitted into the body of ground coffee should be dispersed in a manner such that the quantitative flow of water during the brewing period is substantially the same throughout the body of ground coffee—particularly in devices wherein extraction is obtained by a single passage of hot water through the ground coffee. The presence in the body of ground coffee of channels or areas of low flow resistance as compared with the remainder of the body of ground coffee should be avoided as much as possible in order to attain substantially uniform flow of hot water throughout the ground coffee body.

It is, accordingly, an object of the present invention to provide an infusion device of simple construction wherein the flow of liquid through a body of particulate solids is substantially uniform through said body.

A further object is to provide novel infusion devices of economical construction adapted for brewing coffee.

Another object is to provide novel infusion devices wherein the liquid is introduced in the center of a body of particulate solids in a cloth bag and circulates outwardly through the solids and bag in a substantially uniform manner.

Other objects will appear hereinafter in the description of the invention.

An embodiment of the present invention is illustrated in the drawing wherein.

Figure 1:
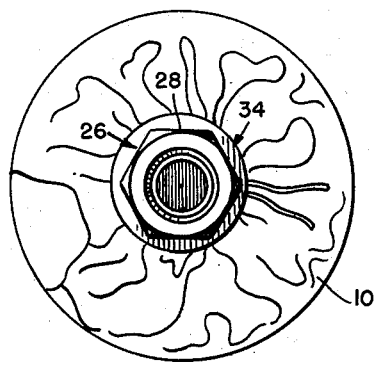
Fig. 1 is a plan view of an infusion device.

In the embodiment illustrated, the infusion device comprises a cloth bag 10 filled with particulate solids 12, e.g., ground coffee, and secured by tie strings 14 around a centrally apertured plastic support disc 16. The disc 16 is supported concentrically about a tubular nozzle 20 by a peripheral flange 18 provided adjacent the supply end as an integral part of tubular nozzle 20.

The disc 16 and nozzle 20 are molded from plastic materials such as high impact polystyrene. The tubular nozzle 20 has a dome-shaped end wall 22 at the discharge end and a plurality of spaced radial apertures 24 of substantially smaller cross-section than the cross-section of the nozzle 20 are provided in the tubular wall. The end wall 22 has at least one aperture 24 therein—three being illustrated in the drawing.

The tubular nozzle 20 is connected at its supply end to a quick-disconnect coupling designated generally at 26. The coupling 26 comprses a base member 28 having a cylindrical, annular recessed section 30. A coil spring 32 is mounted in the recessed section 30 and abuts against the shoulder of the recess at one end thereof. An axially slidable sleeve 34 is mounted on member 28 with the coil spring 32 bearing against an inwardly directed annular shoulder 36 of the sleeve 34. A plurality of metal balls 38 are seated in radial apertures in the lower portion of the member 28. The metal balls 38 are displaceable radially and, when displaced radially inwardly by the shoulder 36, are seated in annular groove 40 of the tubular nozzle 20. A snap ring 42 is secured about the lower end of the tubular member 28 to limit the travel of the slidable sleeve 34 by contact of the snap ring 42 and the shoulder 36 of sleeve 34.

Figure 2:
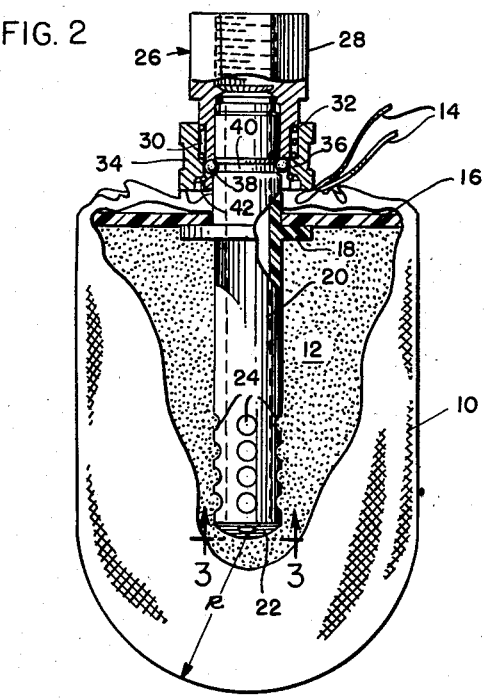
Fig. 2 is an elevation of the infusion device, partly in cross-section, with portions of the device broken away to facilitate illustration of the invention.
Figure 3:
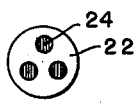
Fig. 3 is an end view of a tubular nozzle taken along the lines 3—3 of Fig. 2.

One of the features of the present invention is the design of the cloth bag 10. It will be seen from Fig. 2 that the cloth bag 10 has a cylindrically-shaped portion substantially coextensive with the tubular nozzle 20 when it is filled with ground coffee or other particulate solids and a closed end of substantially hemispherical shape having a substantially constant radius R with the axis thereof located approximately at the terminal end of the nozzle 20. With the nozzle 20 positioned substantially coaxially in the bag 10, the distance between the cloth bag and the apertures 24 is substantially constant. This design provides substantially the same rate of flow through the solids in the hemispherical portion and the cylindrical portion by providing a substantially uniform distance between the apertures 24 and the walls of the bag 10.

In infusion devices for brewing coffee it is preferred that the radial apertures be positioned approximately centrally in the body of ground coffee. The radial apertures 24 may be located farther up on the tube 24 toward the supply end thereof, if desired, by providing additional apertures 24 or by increasing the longitudinal distance between apertures so long as the upper apertures are maintained a sufficient distance from the top of the body of ground coffee to avoid channelling of the water discharged therefrom upwardly around the nozzle and across the upper surface of the body of ground coffee. If this channelling effect occurs, inadequate contact between the hot water and ground coffee results so that the coffee produced by the infusion device is diluted by the water so channelled.

Another feature of the instant invention is that the assembly unit comprising the cloth bag 10, plastic nozzle 20, and plastic disc 16 are inexpensive materials and may be thrown away after use. Thus, the units may be filled with the proper quantity of coffee and assembled by the coffee processor or supplier by suitable packaging machinery and thereby avoid further labor and handling by the ultimate user, e.g., a coffee vending machine franchise company. The used units may be quickly removed from a coffee vending machine by disengaging the nozzle 20 from the coupling 26 and replaced by a unit containing fresh coffee.

In the brewing of coffee, hot water is pumped through the nozzle 20 from which it exits through apertures 24 into the body of ground coffee 12. Initially, the hot water flows only through the lower portion of the body of ground coffee, but as this portion of coffee is wetted, it swells and increases the resistance of flow of hot water therethrough. As this resistance builds up a portion of the hot water begins to rise and flow through the upper portion of the body of ground coffee so that by the end of a three-minute brewing cycle the coffee grounds throughout the body of coffee are substantially, uniformly extracted. In instances wherein particulate solids are employed but do not have swelling propensities, upon wetting, similar to coffee it will be necessary to locate the upper apertures of the nozzle closer to the top of the body of solids in order to assure that the solids in the upper portion are adequately contacted by the liquid.

The invention is hereby claimed as follows:

1. A coffee infusion device comprising a cylindrical nozzle, a dome shaped end wall closing one end of the nozzle and the other end being detachably coupled to a hot water inlet member, a plurality of circumferentially and longitudinally spaced discharge apertures in said nozzle, at least one discharge aperture in said dome-shaped end wall of the nozzle, a disc member mounted concentrically of said nozzle adjacent the end coupled to said inlet member, a bag enclosing the disc member and the apertured end of the nozzle wherein the bag is supported in relation to the nozzle by the disc member, and ground coffee in the bag filling same, said bag being constructed to have a cylindrical portion concentric said nozzle and extending from the disc member to said nozzle end wall and a substantially hemispherically-shaped portion having all points substantially equidistant from the center of the dome-shaped end wall.

2. A coffee infusion device comprising a cylindrical nozzle, a dome-shaped end wall closing one end of the nozzle and the other end being detachably coupled to a hot water inlet member, a plurality of circumferentially and longitudinally spaced discharge apertures in said nozzle, a plurality of apertures in said dome-shaped end wall of the nozzle, a disc member mounted concentrically of said nozzle adjacent the end coupled to said inlet member, a bag enclosing the disc member and the apertured end of the nozzle wherein the bag is supported in relation to the nozzle by the disc member, said bag having an open end secured about the nozzle adjacent the inlet end thereof, said nozzle and disc member being made of plastic, and ground coffee in the bag filling same, said bag being constructed to have a cylindrical portion concentric said nozzle and extending from the disc member to said nozzle end wall and a substantially hemispherically-shaped portion having all points substantially equidistant from the center of the dome-shaped end wall.

References Cited in the file of this patent

UNITED STATES PATENTS

| | | |
|---|---|---|
| 25,231 | Gowell | Sept. 13, 1859 |
| 494,607 | Buskirk et al. | Apr. 4, 1893 |
| 506,127 | Malhiot | Oct. 3, 1893 |
| 844,953 | Monroe | Feb. 19, 1907 |
| 933,917 | Norwood | Sept. 14, 1909 |
| 1,075,727 | Reichert | Oct. 14, 1913 |
| 1,165,480 | Wood | Dec. 28, 1915 |
| 1,377,316 | Clermont | May 10, 1921 |
| 1,762,208 | Aborn | June 10, 1930 |
| 2,460,735 | Carroll | Feb. 1, 1949 |
| 2,618,218 | Peters | Nov. 18, 1952 |
| 2,783,704 | Liebelt | Mar. 5, 1957 |

UNITED STATES PATENT OFFICE

CERTIFICATE OF CORRECTION

Patent No. 2,926,594                                      March 1, 1960

Otto E. Werner et al.

It is hereby certified that error appears in the printed specification of the above numbered patent requiring correction and that the said Letters Patent should read as corrected below.

Column 2, line 11, for "comprses" read -- comprises --; column 4, line 22, list of references cited, for "25,231" read -- 25,391 --.

Signed and sealed this 3rd day of January 1961.

(SEAL)
Attest:
KARL H. AXLINE

Attesting Officer

ROBERT C. WATSON
Commissioner of Patents